United States Patent [19]

[11] 4,251,725

[45] Feb. 17, 1981

Adkisson

[54] PROGRAMMED SAMPLE PYROLYSIS FOR MASS SPECTROMETER

[75] Inventor: William M. Adkisson, Englewood, Colo.

[73] Assignee: Honeywell Inc., Minneapolis, Minn.

[21] Appl. No.: 63,816

[22] Filed: Aug. 6, 1979

[51] Int. Cl.[3] ........................ H01J 27/00; B01D 59/44

[52] U.S. Cl. .................................... 250/281; 250/282; 250/425

[58] Field of Search .................... 250/423 R, 281, 282, 250/424–427

[56] References Cited

U.S. PATENT DOCUMENTS

| | | | |
|---|---|---|---|
| 3,336,475 | 8/1967 | Kilpatrick | 250/423 R |
| 3,996,469 | 12/1976 | Janes | 250/281 |
| 4,122,343 | 10/1978 | Risby et al. | 250/282 |
| 4,124,801 | 11/1978 | Cook et al. | 250/423 R |
| 4,163,153 | 7/1979 | Tamura | 250/423 R |

*Primary Examiner*—Harold A. Dixon

*Attorney, Agent, or Firm*—Lockwood D. Burton; Mitchell J. Halista

[57] ABSTRACT

Pyrolyzing apparatus for a mass spectrometer includes a sample holder in the form of a small glass rod having in the end thereof a cylindrical depression of a predetermined small volume. The indentation is to be filled with the predetermined quantity of the substance to be analyzed. The rod is inserted into a supporting structure with the sample holding depression immediately adjacent the ionizing chamber of a quadrupole mass spectrometer. Surrounding the end of the glass rod holding the sample is a heater element which is energized in accordance with a predetermined program to rapidly raise the temperature of the sample to a predetermined initial level, then to increase the temperature of the sample in accordance with an exponential curve to a maximum of a predetermined temperature level. The shape of the sample holder is such that, under the influence of the heat, substantially all of the pyrolyzed molecules will be directed into the ionization chamber where the molecules will be ionized. The ionized molecules will then be directed into the quadrupole separator, toward a collector.

10 Claims, 4 Drawing Figures

PROGRAMMED SAMPLE PYROLYSIS FOR MASS SPECTROMETER

BACKGROUND OF THE INVENTION

The present invention relates a mass spectrometer. More particularly, it relates to an improved sample injection method and apparatus for a mass spectrometer.

In mass spectrometric apparatus particularly of the type known as a quadrupole mass spectrometer, a number of different approaches have been provided for introducing the sample to be analyzed into the spectrometer. These have included such means as a conduit for introducing a sample of gas, when the substance to be analyzed is a gas. Others include a pyrolyzer in which the substance to be analyzed is coated on to a needle-like structure. The needle structure is rapidly heated to a temperature to pyrolyze the substance thereon, which pyrolyzed substance is then introduced into the spectrometer. The pyrolyzers of the existing apparatus introduce the limitation that the range of the analysis is relatively limited because the pyrolysis technique produces a temperature characteristic which is specific to a limited range of components to be pyrolyzed. A second disadvantage of the previous pyrolysis apparatus is that the molecular beams resulting from the pyrolysis of the substance tends to radiate in all directions from the surface of the carrier with only a small portion of the resulting molecules being directed toward the analyzer apparatus.

SUMMARY OF THE INVENTION

It is, accordingly, an object of the present invention to provide an improved mass spectrometer apparatus and method.

It is another object of the present invention to provide an improved means for introducing the substance to be analyzed into a mass spectrometer.

It is a further object of the present invention to provide an improved means and method for pyrolyzing substance to be analyzed in a mass spectrometer including a wider range of analysis and a greater efficiency of pyrolysis and with a high order of repeatability in the process.

In accomplishing these and other objects, there has been provided, in accordance with the present invention, a sample holder in the form of a small glass rod having in the end thereof a cylindrical depression of a predetermined small volume. The indentation is to be filled with the predetermined quantity of the substance to be analyzed. The rod is inserted into a supporting structure with the sample holding depression immediately adjacent the ionizing chamber of a quadrupole mass spectrometer. Surrounding the end of the glass rod holding the sample is a heater element which is energized in accordance with a predetermined program to rapidly raise the temperature of the sample to a predetermined initial level, then to increase the temperature of the sample in accordance with a exponential curve to a maximum of a predetermined temperature level. The shape of the sample holder is such that, under the influence of the heat, substantially all of the pyrolyzed molecules will be directed into the ionization chamber where the molecules will be ionized. The ionized molecules will then be directed into the quadrupole separator, toward a collector.

BRIEF DESCRIPTION OF THE DRAWINGS

A better understanding of the present invention may be had from the following detailed description when read in the light of the accompanying drawings in which.

DETAILED DESCRIPTION

Figure 1:
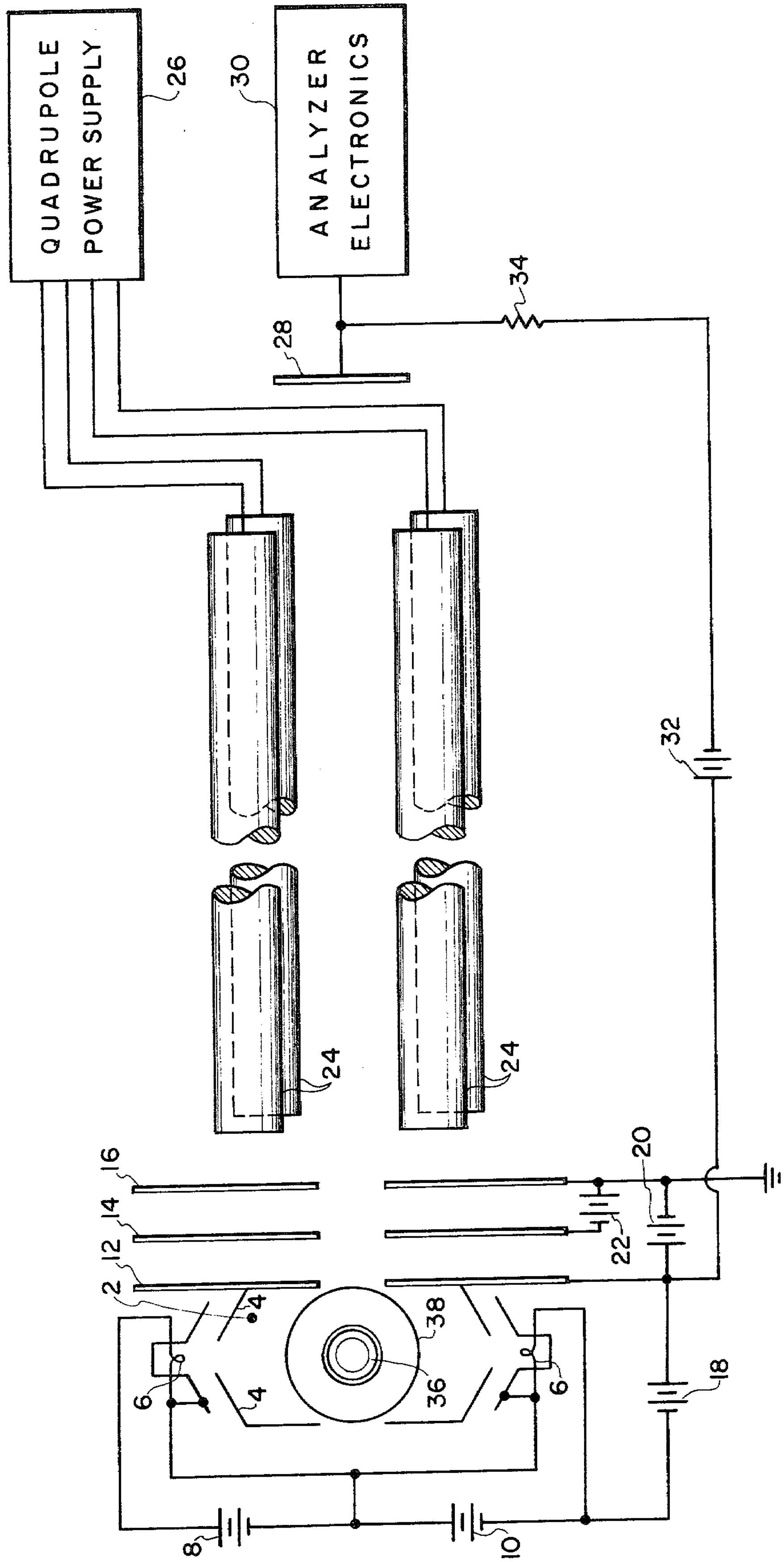
FIG. 1 is a schematic representation of a quadrupole spectrum analyzer embodying the present invention.
Figure 2:
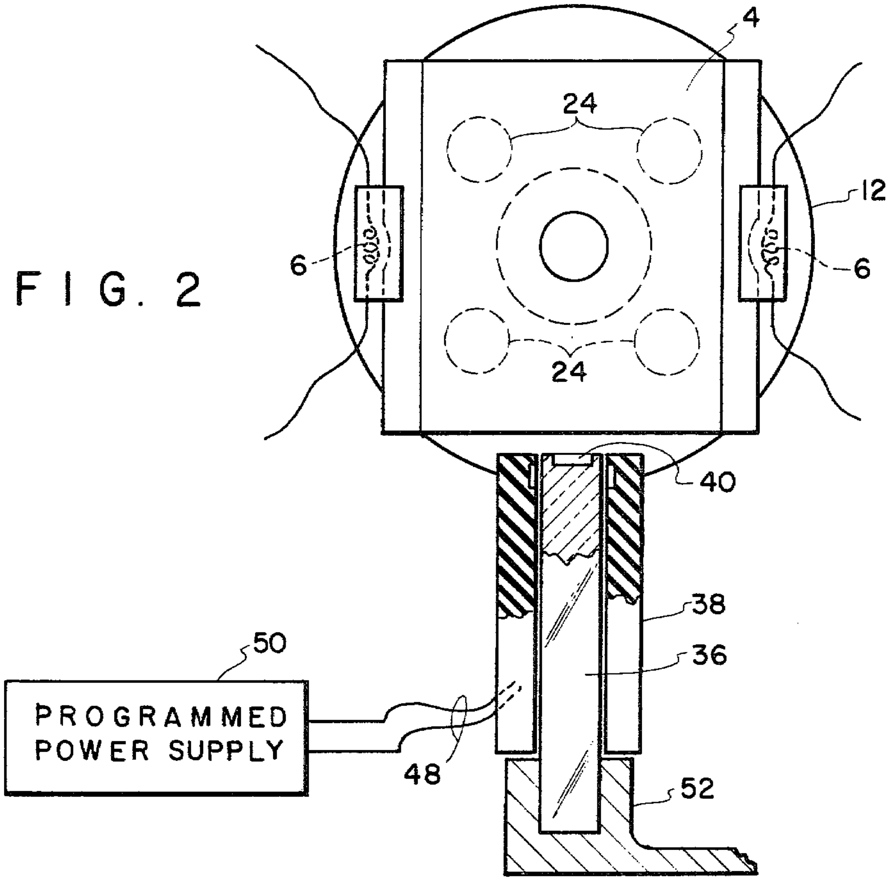
FIG. 2 is an end view of the structure shown in FIG. 1.

In FIGS. 1 and 2 there is shown a schematic representation of a quadrupole mass spectrometer which may generally be of the type manufactured and sold by Balzers Corporation but modified in accordance with the present invention. The mass spectrometer of FIGS. 1 and 2 include an ion chamber 2 defined by a cage structure 4 and a pair of cathodes 6. The cathodes are energized from a power supply source represented by a pair of batteries 8 and 10, respectively. A plurality of accelerating electrodes 12, 14 and 16, respectively, are provided adjacent the ionization chamber 2, the electrode 12 constituting one side wall of the chamber 2. The electrodes 12, 14 and 16 are suitably biased from a power supply source represented by the batteries 18, 20 and 22. The electrodes 12, 14 and 16 are provided with aligned coaxial apertures which are in alignment with the axis of a quadrupole separator. The quadrupole separator is represented by four cylindrical electrodes 24 which are arranged in a rectangular parallel array. The four electrodes 24 are connected for energization to a quadrupole power supply 26. The power supply 26 energizes the four cylindrical electrodes with a high frequency signal superimposed upon a d.c. signal, this in accordance with established quadrupole analyzer technology.

In alignment with the central axis of the space defined by the four cylindrical electrodes 24 and in alignment with the central apertures of the accelerator electrodes 12, 14 and 16, and at the opposite end of the quadrupole structure from the accelerator electrodes, there is positioned a collector electrode 28. The collector electrode 28 is electrically connected to the input of suitable analyzer electronics 30. The collector electrode 28 is biased to a predetermined level from the power supply as represented by the battery 32 and the load resistor 34.

In close proximity to the ionization chamber 2, there is positioned a specimen holder 36 surrounded by an insulating jacket 38. The specimen holder is preferably in the form of a glass rod which may be on the order of a quarter of an inch in diameter with a small, shallow cylindrical indentation 40 in the upper end thereof. The indentation or receptacle 40 is preferably of a predetermined volume, for example, such as would contain $>20$ micrograms of a specimen 42. The insulating jacket 38, as may be more clearly seen in FIG. 3, comprises a hollow cylindrical structure 38 of electrical and thermal insulating properties with the outside thereof encased in an electromagnetic shield 44. Within and supported by the insulating shell 38 and substantially surrounding the upper end of the glass rod 36, there is positioned a flat ribbon 46 which comprises a heater element for heating the upper end of the specimen holder 36. A pair of leads 48 connect the ribbon heater 46 to a programmed power supply 50 for heating the specimen 42 in accordance with a predetermined program that will be discussed in more detail hereinafter. In FIG. 2, the glass rod specimen holder is shown as being carried by a cup shaped rod holder 52. The holder 52 is representative of the means for supporting the glass rod specimen holder 36. It is anticipated that the holder 52 will be movable between the position shown and a position whereat the glass rod 36 may be removed from the holder 52, replaced by a fresh rod with a new specimen 42, and returned to the position shown in FIG. 2.

Figure 3:
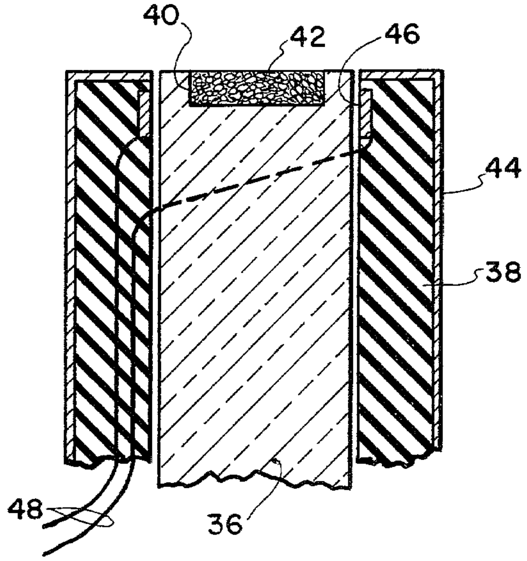
FIG. 3 is an enlarged fragmentary view of a specimen holder according to the present invention.

In operation, it will be appreciated that the apparatus shown in FIGS. 1, 2 and 3 are enclosed in suitable chamber means which may be pumped down to achieve a high vacuum with suitable valving to allow the specimen holder to be inserted and removed. A quantity of substance to be pyrolyzed and analyzed may be placed in the receptacle 40 of the glass rod specimen holder 36, and the excess removed as by a suitable doctor blade thereby placing a fixed quantity of the substance 42 in the receptacle 40 for analysis. When the substance to be analyzed is in the form of a micro-organism, it is anticipated that a quantity of the microorganism will be removed from a suitable culture medium and placed on a glass slide. The specimen holder 36 may then be inverted over a selected colony and pressed down onto the glass slide with the selected colony being squeegeed into the receptacle 40. When the selected substance has been placed in the receptacle 40 of the specimen holder 36, the specimen holder is placed in the rod holder 52 and inserted into the mass spectrometer structure.

In the position shown in FIGS. 1, 2 and 3, the mass spectrometer is then evacuated in accordance with standard procedures. The process of evacuating the chamber would, of course, cause any residual water in the specimen substance 42 to be removed. When the desired vacuum has been established, the cathodes 6, the several electrodes 12, 14 and 16, the quadrupole separator electrodes 24 and the collector electrode 28 are all suitably energized by the associated power supply elements. The heater 46 is then energized by the programmed power supply 40 through the leads 48.

Figure 4:
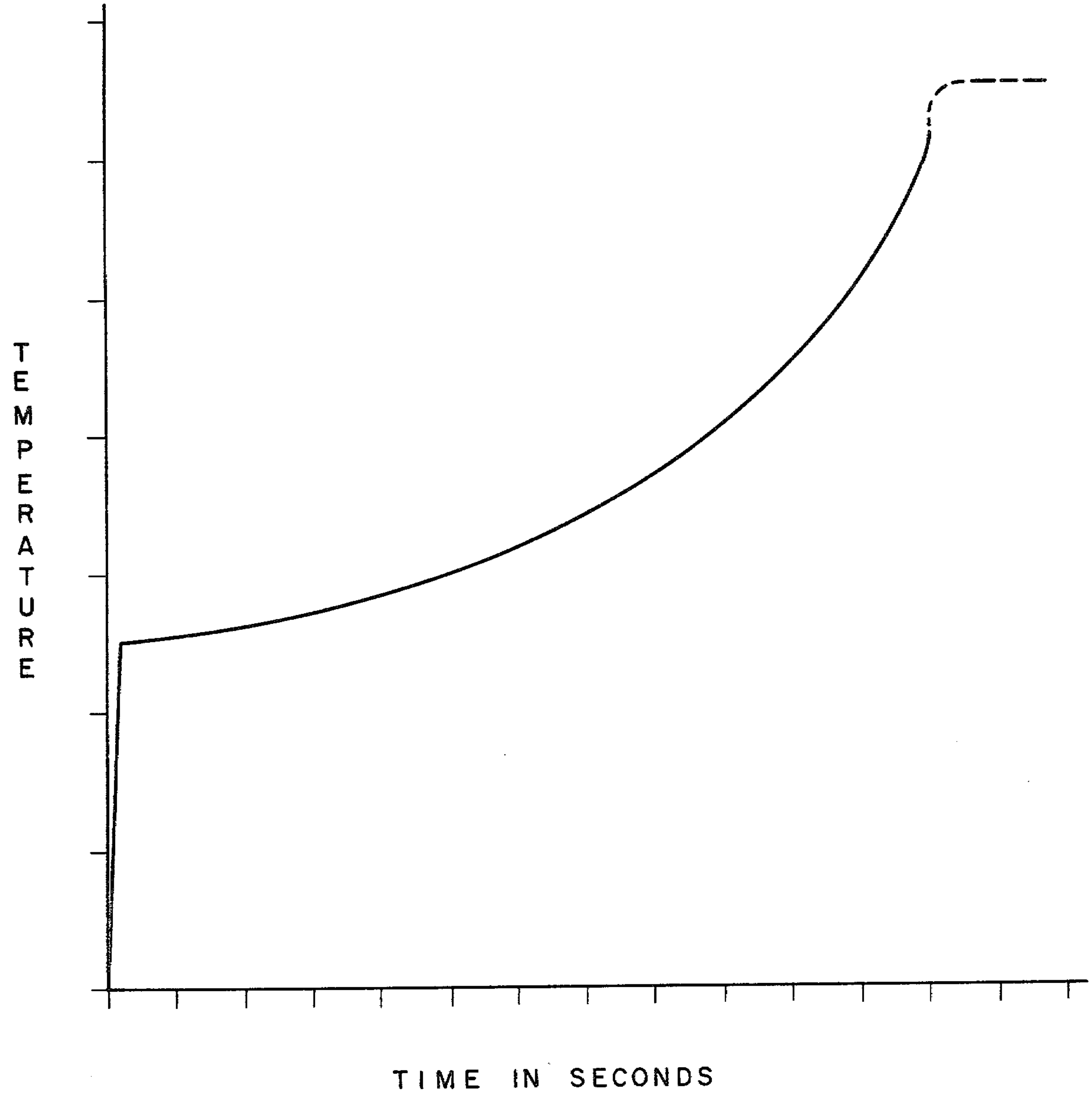
FIG. 4 is a chart illustrating a preferred typical heating curve for the specimen in accordance with the present invention.

The power supply 50 is programmed to heat the specimen 42 in the holder 36 substantially in accordance with the curve illustrated in FIG. 4. The objective of the heating or pyrolyzing of the substance 42 in the receptacle 40 is to cause the molecular disassociation of the components which are then projected into the ionization chamber 2 where the molecules are ionized and formed into an ionized beam projected down between the quadrupole separators 24 and eventually collected on the collector electrode 28. In complex substances, however, different molecular components disassociate at different temperature, the more volatile components being disassociated at the lower temperatures and requiring a lower rate of change of temperature while the less volatile components disassociate at a much higher temperature and with a higher rate of change of temperature.

In certain of the structures heretofore used, the needle-like structure carrying the specimen was quickly heated to a relatively high temperature. While that high temperature was suitable for an analysis of the lower volatility components, the higher volatility substances produced an undecipherable jumble of data because of the disassociation of molecules. This, of course, produced an unsatisfactory record of the substances of higher volatility and produced a relatively narrow range of data relative to the less volatile substances. In other apparatus, attempts have been made to produce a linear increase in temperature with time. These efforts also have resulted in an unsatisfactory record over a wide range.

In accordance with the present invention, as may be seen from FIG. 4, the heater is programmed to increase the temperature of the specimen rapidly to an initial temperature just below which the more volatile components of the substance begin to disassociate. This may be in the order of 200 to 250 degrees centigrade. The energization of the heater is then controlled by the programmed power supply 50 to produce a gradual increase in the temperature of the specimen with an increasing rate following substantially an exponential rise to a point of most rapid rise to a maximum temperature and rate of change of temperature of about 550 degrees centigrade over a period of about 12 seconds. This allows the more volatile components to be disassociated completely and increases the temperature through the range where the intermediate volatility components may be disassociated up through the range where the less volatile components may be disassociated.

It was mentioned earlier herein that when the molecular particles disassociate from the body of the substance, they tend to radiate from that surface. The configuration of the specimen holder in accordance with the present invention is such that the radiation pattern is highly concentrated to direct the flow of such molecular particles directly into the ion chamber for ioniziation therein, in contrast with the wasteful scattering of the molecular components in the previous apparatus. Further, the calibrated volume of the receptacle 40 provides for a high order of accuracy and repeatability of the analysis of a given specimen because of the constancy of the volume of the specimen being tested.

The units of measure for the spectrograph resulting from an analysis by a mass spectrograph of the general type set forth herein is in terms of mass per electron charge. With the improvements set forth in accordance with the present invention, a wide range of accurate measurements may be made from near the zero end of the scale out to approximately 1,000 on the M scale.

Thus, there has been provided, in accordance with the present invention, an improved mass spectrographic apparatus which provides for a wide range highly accurance, highly repeatable analysis.

The embodiments of the invention in which an exclusive property or privilege is claimed are defined as follows:

1. In a quadrupole mass spectrometer having an ionization chamber for ionizing particles of a specimen, an improved specimen pyrolysis assembly comprising:

a cylindrical rod specimen holder having a shallow specimen receptacle formed in one end thereof, said receptacle being arranged to hold a predetermined quantity of said specimen, means for positioning said specimen holder with said receptacle adjacent said ionization chamber, and heating means positioned adjacent said one end to heat said specimen in accordance with a controlled program with an initial high rate of temperature change, and a subsequent non-linear rate of temperature change whereby to cause said specimen to disassociate into component parts over a wide range and to project said component parts into said ionization chamber.

2. In a quadrupole mass spectrometer having an ionization chamber for ionizing particles of a specimen, an improved specimen pyrolysis assembly comprising:

a glass cylindrical rod specimen holder having a shallow cylindrical specimen receptacle formed in one end thereof, said receptacle being arranged to hold a predetermined quantity of specimen, means for positioning said specimen holder with said receptacle adjacent said ionization chamber, and heating means positioned adjacent said one end to heat said specimen in accordance with a controlled program with an initial high rate of temperature change, and a subsequent non-linear rate of temperature change whereby to cause said specimen to disassociate into component parts over a wide range and to project said component parts into said ionization chamber.

3. An improved specimen pyrolysis assembly as set forth in claim 2 wherein said specimen holder is encompassed by an electrical and thermal insulating jacket.

4. An improved specimen pyrolysis assembly as set forth in claim 3 wherein said insulating jacket is encased in an electromagnetic shield.

5. An improved specimen pyrolysis assembly as set forth in claim 4 wherein said heating means comprises a flat ribbon conductor carried by said insulating jacket and energized from a power supply.

6. An improved specimen pyrolysis assembly as set forth in claim 5 wherein said power supply includes programmed control means for heating said specimen in accordance with a predetermined non-linear schedule.

7. An improved specimen pyrolysis assembly as set forth in claim 6 wherein said predetermined schedule is defined by a logarithmic curve.

8. An improved specimen pyrolysis assembly as set forth in claim 7 wherein said heating schedule along said exponential curve comprises a period of about twelve seconds.

9. In a quadrupole mass spectrometer having an ionization chamber for ionizing particles of a specimen, an improved method of pyrolyzing said specimen comprising:

placing a predetermined quantity of said specimen in a shallow depression in the end of a glass rod specimen holder, inserting said specimen holder into said mass spectrometer with said quantity of said specimen adjacent said ionization chamber, and heating said specimen through a predetermined range of temperatures in accordance with a predetermined program with an initial high rate of temperature change, and a subsequent non-linear rate of temperature change.

10. An improved method of pyrolyzing as set forth in claim 9 wherein said range of temperature extends from about 200 C. to 550 C. and wherein said program includes increasing said temperature through said range in accordance with an exponential curve over a period of about twelve seconds.

* * * * *